United States Patent
Shimizu

(10) Patent No.: US 12,358,799 B2
(45) Date of Patent: Jul. 15, 2025

(54) METAL OXIDE PARTICLES SURFACE MODIFIED WITH QUATERNARY AMMONIUM GROUP, AND METHOD FOR PRODUCING SAME

(71) Applicant: FUSO CHEMICAL CO., LTD., Osaka (JP)

(72) Inventor: Tomoko Shimizu, Fukuchiyama (JP)

(73) Assignee: FUSO CHEMICAL CO., LTD., Osaka (JP)

(*) Notice: Subject to any disclaimer, the term of this patent is extended or adjusted under 35 U.S.C. 154(b) by 863 days.

(21) Appl. No.: 17/294,470

(22) PCT Filed: Nov. 28, 2019

(86) PCT No.: PCT/JP2019/046550
§ 371 (c)(1),
(2) Date: May 17, 2021

(87) PCT Pub. No.: WO2020/116307
PCT Pub. Date: Jun. 11, 2020

(65) Prior Publication Data
US 2022/0009784 A1    Jan. 13, 2022

(30) Foreign Application Priority Data
Dec. 4, 2018   (JP) .................. 2018-227155

(51) Int. Cl.
*C01B 33/12* (2006.01)
*B82Y 30/00* (2011.01)
*B82Y 40/00* (2011.01)

(52) U.S. Cl.
CPC ............ *C01B 33/126* (2013.01); *B82Y 30/00* (2013.01); *B82Y 40/00* (2013.01); *C01P 2004/03* (2013.01); *C01P 2004/64* (2013.01)

(58) Field of Classification Search
CPC ....... C01B 33/126; C01B 33/18; B82Y 30/00; B82Y 40/00; C01P 2004/03; C01P 2004/64; C09C 1/28; C09C 3/12
See application file for complete search history.

(56) References Cited

U.S. PATENT DOCUMENTS

| | | | |
|---|---|---|---|
| 2001/0034381 A1 | 10/2001 | Sugino et al. | |
| 2004/0009294 A1 | 1/2004 | Kuribayashi et al. | |
| 2010/0048775 A1 | 2/2010 | Mihara et al. | |
| 2018/0224438 A1* | 8/2018 | Aspinwall | B01J 20/286 |
| 2018/0334551 A1* | 11/2018 | Rodionov | C08K 7/26 |

FOREIGN PATENT DOCUMENTS

| | | | | |
|---|---|---|---|---|
| CN | 1147868 A | 4/1997 | | |
| CN | 1462778 A | 12/2003 | | |
| CN | 101616981 A | 12/2009 | | |
| DE | 102008052678 A1 * | 4/2010 | ........... | C08G 65/336 |
| JP | 2001-311018 A | 11/2001 | | |
| JP | 2005-162533 A | 6/2005 | | |
| JP | 2011-512379 A | 4/2011 | | |
| JP | 2012-515806 A | 7/2012 | | |
| JP | 2012-524020 A | 10/2012 | | |
| JP | 2013-18690 A | 1/2013 | | |
| JP | 2014-513660 A | 6/2014 | | |
| JP | 2015-048297 A | 3/2015 | | |
| JP | 2016-11224 A | 1/2016 | | |
| JP | 2018-44116 A | 3/2018 | | |
| WO | 2009/103651 A2 | 8/2009 | | |
| WO | 2010/085324 A1 | 7/2010 | | |
| WO | 2010/121878 A1 | 10/2010 | | |
| WO | 2012/123386 A1 | 9/2012 | | |

OTHER PUBLICATIONS

Machine translation of DE102008052678A1 (Year: 2010).*
International Search Report dated Mar. 3, 2020, issued in counterpart International Application No. PCT/JP2019/046550 (2 pages).
Office Action dated Sep. 13, 2023, issued in counterpart CN Application No. 201980080650.2, with English translation. (11 pages).
Office Action dated Nov. 6, 2024, issued in counterpart KR Application No. 10-2021-7020404, with English translation. (9 pages).

* cited by examiner

*Primary Examiner* — Sally A Merkling
*Assistant Examiner* — Logan Edward Laclair
(74) *Attorney, Agent, or Firm* — WHDA, LLP

(57) ABSTRACT

A metal oxide particle is disclosed having a surface modified with a silyl group and having an aggregation ratio of 5.0 or less, the silyl group being at least one group selected from the group consisting of a silyl group represented by general formula (1):   —Si(X)$_n$-[L-CR$^1$(OH)—C(R$^2$)$_2$-A]$_{3-n}$   (1), wherein X is the same or different, and each represents a hydroxy group or the like; n is 0, 1, or 2; L is a linkage group; R$^1$ is a hydrogen atom or the like; R$^2$ is the same or different, and each represents a hydrogen atom or the like; and A is a quaternary ammonium group, and a silyl group represented by general formula (2):

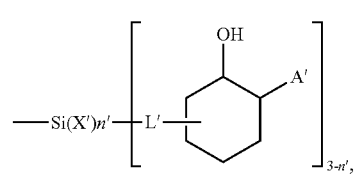

(2)

wherein X' is the same or different, and each represents a hydroxy group or the like; n' is 0, 1, or 2; L' is a linkage group; and A' is a quaternary ammonium group.

16 Claims, No Drawings

METAL OXIDE PARTICLES SURFACE MODIFIED WITH QUATERNARY AMMONIUM GROUP, AND METHOD FOR PRODUCING SAME

TECHNICAL FIELD

The present invention relates to metal oxide particles with a surface modified with a quaternary ammonium group and to a method for producing them.

BACKGROUND ART

Metal oxide particles are used as, for example, abrasive grains for chemical polishing (CMP) of semiconductor substrates etc., fillers for resins, paints for optical materials, external additives for toner resin particles for printing, and cosmetic materials. Surface modification treatment of particles is widely performed for the purpose of, for example, improving the dispersion stability of the particles and imparting to the particles characteristics according to the use. Silane coupling treatment is one such surface modification treatment. Typically, in silane coupling treatment, an alkoxysilane having a functional group, such as Z—Si(OD)$_3$ (wherein Z represents a functional group, and D represents an alkyl group), is used as a silane coupling agent. The alkoxy group of alkoxysilane reacts with OH groups on the particle surface (typically, dehydration-condensation reaction) to form Z—Si—O-particles, whereby the particle surface is modified (in this case, the functional group Z being introduced). The surface modification (sometimes referred to as "denaturation") imparts to the particles properties corresponding to the introduced functional group of the silyl group. For example, the introduction of an amino group is known to increase the surface potential of the particles and increase the pH region that shows positive potential (Patent Literature (PTL) 1 and Example 7 of PTL 2).

On the other hand, during the process of surface modification, the particles may aggregate to form particles with a greater aggregation ratio or form coarse particles (e.g., Example 7 in PTL 2). When the particles with a greater aggregation ratio or coarse particles are used as abrasive grains for chemical polishing, scratches tend to occur on the surface of the polished substrate. Further, commercially available silane coupling agents that contain a quaternary ammonium group contain halide ions, which affect metal corrosion. Since halide ions undesirably remain in the slurry, these silane coupling agents are undesirable for use in chemical polishing when metals are used as a target for polishing. Additionally, the following methods have been reported: a method for treating silica with a liquid containing silane hydroxide synthesized from chloropropyltriethoxysilane to have a tetramethylethylenediamine structure (PTL 3), and a method in which 3-chloro-2-hydroxypropyldimethyldodecylammonium chloride is added to a dispersion of 3-aminopropylsilane-denatured silica nanoparticles (PTL 4).

CITATION LIST

Patent Literature

PTL 1: JP2005-162533A
PTL 2: JP2012-515806A
PTL 3: JP2012-524020A
PTL 4: JP2011-512379A

SUMMARY OF INVENTION

Technical Problem

An object of the present invention is to provide, for example, a metal oxide particle having a surface modified with a quaternary ammonium group and having an aggregation ratio that is not large, or provide, for example, a metal oxide particle having a surface modified with a quaternary ammonium group and having a low halogen content and an aggregation ratio that is not large. Another object is to provide, for example, a method for producing a metal oxide particle having a surface modified with a quaternary ammonium group and having an aggregation ratio that is not large, or provide, for example, a method for producing a metal oxide particle having a surface modified with a quaternary ammonium group without using halides.

Solution to Problem

In order to solve the above problems, the present inventor conducted extensive research and found the following. Specifically, when a silane coupling agent having an epoxy ring and a tertiary amine are used for surface modification of metal oxide particles, the epoxy ring opens and is bonded to the tertiary amine, whereby particles having a surface modified with a quaternary ammonium group corresponding to the structure of the tertiary amine are obtained without using halides, and whereby aggregation of the particles can be suppressed, achieving a lower aggregation ratio (in the present invention, the term "aggregation ratio" refers to an average particle size measured by DLS (dynamic light scattering)/average diameter of primary particles measured in an SEM image). The present invention typically encompasses the following embodiments.

Item 1. A metal oxide particle having a surface modified with a silyl group and having an aggregation ratio (average particle size measured by dynamic light scattering/average diameter of primary particles measured in an SEM image) of 5.0 or less, the silyl group being at least one group selected from the group consisting of a silyl group represented by general formula (1):

$$—Si(X)_n\text{-}[L\text{-}CR^1(OH)—C(R^2)_2\text{-}A]_{3-n} \quad (1),$$

wherein

X is the same or different, and each represents a hydroxy group, a hydrolyzable substituent, a non-hydrolyzable substituent, a bond with Si of another silyl group via —O—, or a bond with a metal atom on the particle surface via —O—;

n is 0, 1, or 2;

L is a linkage group;

$R^1$ is a hydrogen atom, or an alkyl group that may contain an amino group, a hydroxy group, or an unsaturated bond;

$R^2$ is the same or different, and each represents a hydrogen atom, or an alkyl group that may contain an amino group, a hydroxy group, or an unsaturated bond; and A is a quaternary ammonium group, and
a silyl group represented by general formula (2):

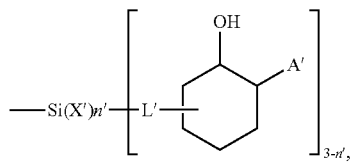

wherein
X' is the same or different, and each represents a hydroxy group, a hydrolyzable substituent, a non-hydrolyzable substituent, a bond with Si of another silyl group via —O—, or a bond with a metal atom on the particle surface via —O—;
n' is 0, 1, or 2;
L' is a linkage group; and
A' is a quaternary ammonium group.

Item 2. The metal oxide particle according to Item 1, wherein the metal oxide particle has an absolute specific gravity of 1.60 or more in a dry powder state.

Item 3. The metal oxide particle according to Item 1 or 2, wherein the metal oxide particle is a silica particle.

Item 4. The metal oxide particle according to any one of Items 1 to 3, wherein the aggregation ratio is 1.5 to 5.0.

Item 5. The metal oxide particle according to any one of Items 1 to 4, wherein the average diameter of primary particles is 120 nm or less.

Item 6. The metal oxide particle according to any one of Items 1 to 5, wherein the halogen content per gram of the metal oxide particle is 10 μmol/mL·g or less.

Item 7. A method for producing a metal oxide particle with a surface having a quaternary ammonium group, the method comprising the steps of:
(a) mixing a metal oxide particle, a tertiary amine, and a silane coupling agent having an epoxy ring in any order in the presence or absence of water and/or an organic solvent; and
(b) mixing an acid with the mixture obtained in step (a).

Item 8. The production method according to Item 7, wherein the pH of the mixture liquid obtained in step (b) by adding the acid is in a range of 0 to 10.

Item 9. The production method according to Item 7 or 8, wherein the acid is at least one member selected from the group consisting of inorganic acids and monovalent organic acids.

Advantageous Effects of Invention

The present invention can provide a metal oxide particle having a surface modified with a quaternary ammonium group and having a low halogen content and a low aggregation ratio with fewer coarse particles. Further, the present invention can produce a metal oxide particle with a surface having a quaternary ammonium group without using silanes containing halide ions or silanes containing halogen.

DESCRIPTION OF EMBODIMENTS

One embodiment of the present invention provides a metal oxide particle having a surface modified with a silyl group and having an aggregation ratio (average particle size measured by dynamic light scattering/average diameter of primary particles measured in an SEM image) of 5.0 or less, the silyl group being at least one group selected from the group consisting of a silyl group represented by general formula (1):

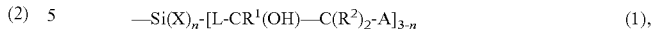

wherein
X is the same or different, and each represents a hydroxy group, a hydrolyzable substituent, a non-hydrolyzable substituent, a bond with Si of another silyl group via —O—, or a bond with a metal atom on the particle surface via —O—;
n is 0, 1, or 2;
L is a linkage group;
$R^1$ is a hydrogen atom, or an alkyl group that may contain an amino group, a hydroxy group, or an unsaturated bond;
$R^2$ is the same or different, and each represents a hydrogen atom, or an alkyl group that may contain an amino group, a hydroxy group, or an unsaturated bond; and
A is a quaternary ammonium group, and
a silyl group represented by general formula (2):

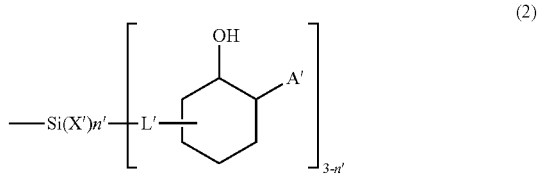

wherein
X' is the same or different, and each represents a hydroxy group, a hydrolyzable substituent, a non-hydrolyzable substituent, a bond with Si of another silyl group via —O—, or a bond with a metal atom on the particle surface via —O—;
n' is 0, 1, or 2;
L' is a linkage group; and
A' is a quaternary ammonium group.

In the present invention, the term "surface modification" is used as having a meaning usually used in the art of introducing a silyl group from a silane coupling agent into an inorganic material by treating the inorganic material with the silane coupling agent. This term may also be referred to as "denaturation." Typically, the term refers to the state in which a silyl group is linked to the surface of a metal oxide particle by covalent bonding (preferably metalloxane bonding). In addition to covalent bonding, the bonding can also be ionic bonding, hydrogen bonding, chemisorption, physisorption, or the like. In one embodiment, in the metal oxide particle of the present invention, at least one group selected from the group consisting of a silyl group represented by general formula (1) and a silyl group represented by general formula (2) is linked to the particle surface by covalent bonding (preferably metalloxane bonding). For example, Si in the silyl group described above is covalently bonded to the particle surface via —O—. Si in the silyl group described above may have 1, 2, or 3 of these bonds formed via —O—.

The metal oxide particle of the present invention is typically obtained by the production method of the present invention. However, those obtained by other methods are also encompassed by the metal oxide particle of the present invention as long as they have a surface modified with the silyl group described above.

In the present invention, the degree of surface modification can be calculated by taking the difference between the elemental analysis values of the metal oxide particles in a dry powder state before and after surface modification. More specifically, a slurry containing the metal oxide particles is centrifuged, and the precipitate is dried to a powder state, which is then elementally analyzed to determine the nitrogen concentration. The degree of surface modification can be expressed as the increase in the nitrogen concentration after surface modification compared with the nitrogen concentration before surface modification.

In the present invention, the degree of surface modification is represented as an increase in the nitrogen concentration, and is, for example, 0.03% by mass or more, preferably 0.06% by mass or more, and more preferably 0.10% by mass or more.

Metal Oxide Particle

The metal oxide particles of the present invention are, for example, silica (silicon oxide) particles, cerium oxide particles, titanium oxide particles, aluminum oxide particles, zirconium oxide particles, tin oxide particles, or manganese oxide particles, and preferably silica particles, cerium oxide particles, titanium oxide particles, aluminum oxide particles, or manganese oxide particles. Alternatively, the metal oxide particles of the present invention may be composite particles of these. Examples of the composite particles include particles obtained by covering silica as a core particle with a shell of cerium oxide. The metal oxide particles are more preferably silica particles, and even more preferably colloidal silica. The colloidal silica is not particularly limited, and is preferably colloidal silica synthesized using an alkoxysilane or sodium silicate as a starting material, and still more preferably colloidal silica synthesized using an alkoxysilane (e.g., tetramethoxysilane and tetraethoxysilane) as a starting material. In order to avoid contamination by halogens having metal corrosive properties, the metal oxide particles are preferably prepared by using a halogen-free metal salt or metal alkoxide as a starting material. Further, in order to avoid contamination by metal impurities (e.g., Na), the metal oxide particles are preferably prepared by using a metal alkoxide as a starting material.

In the present invention, the average diameter of primary particles of the metal oxide particle is determined according to the following method.

Average Diameter of Primary Particles

The average value is calculated from the diameters of 50 randomly selected primary particles measured in an image (SEM image) with 200000× magnification of metal oxide particles photographed with a scanning electron microscope (SEM).

In the present invention, the average diameter of primary particles of the metal oxide particle before surface modification is not particularly limited and can be appropriately selected according to, e.g., the use. The average diameter of primary particles of the metal oxide particle before surface modification is, for example, 1 nm or more, and preferably 5 nm or more, and is, for example, 350 nm or less, preferably 150 nm or less, more preferably 120 nm or less, and even more preferably 90 nm or less. Further, the average diameter of primary particles of the metal oxide particle before surface modification is, for example, 1 nm to 350 nm, preferably 5 nm to 120 nm, and more preferably 5 nm to 90 nm.

In the present invention, the average diameter of primary particles of the metal oxide particle after surface modification is not particularly limited and can be appropriately selected according to, e.g., the use. The average diameter of primary particles of the metal oxide particle after surface modification is, for example, 1 nm or more, and preferably 5 nm or more, and is, for example, 350 nm or less, preferably 150 nm or less, more preferably 120 nm or less, and even more preferably 90 nm or less. Furthermore, the average diameter of primary particles of the metal oxide particle after surface modification is, for example, 1 nm to 350 nm, preferably 5 nm to 120 nm, and more preferably 5 nm to 90 nm. When the average diameter is within the above range, sedimentation of the particles is less likely to occur when the particles are used as abrasive grains in an abrasive.

In the present invention, the particle size of secondary particles of the metal oxide particle after surface modification is determined, for example, according to the following method.

Average Particle Size Measured by Dynamic Light Scattering (Particle Size of Secondary Particles)

A sample for measurement by a dynamic light scattering method is prepared by mixing a dispersion of metal oxide particles and a 0.3% by weight aqueous citric acid solution. Using this sample for measurement, the secondary particle size is measured by a dynamic light scattering method (ELSZ-2000S manufactured by Otsuka Electronics Co., Ltd.).

In the present invention, the aggregation ratio of the surface-modified metal oxide particle is expressed as (average particle size measured by dynamic light scattering)/(average diameter of primary particles measured in an SEM image), and is typically 5.0 or less, preferably 4.0 or less, more preferably 3.5 or less, and even more preferably 3.0 or less. Further, the aggregation ratio is, for example, 1.0 or more, and preferably 1.5 or more. When particles having an aggregation ratio within the above range are used as abrasive grains of an abrasive, the formation of scratches on the polished surface is easily suppressed, and the removal rate in chemical mechanical planarization is easily improved compared with spherical grains. The aggregation ratio can also be, for example, 1.0 to 5.0, 1.5 to 5.0, 1.0 to 4.0, 1.5 to 4.0, 1.0 to 3.5, 1.5 to 3.5, 1.0 to 3.0, or 1.5 to 3.0.

In the present invention, the absolute specific gravity (unit: $g/cm^3$) of the surface-modified metal oxide particle is, for example, 1.60 or more, 1.70 or more, preferably 1.90 or more, and more preferably 2.00 or more, and is, for example, 7.50 or less, preferably 6.00 or less, and more preferably 2.50 or less. When particles having an absolute specific gravity within the above range are used as abrasive grains in an abrasive, the mechanical polishing ability of the particles and the removal rate are easily improved.

The absolute specific gravity may be a value measured by a liquid phase displacement method using ethanol after drying metal oxide particles on a hot plate at 150° C. and calcining in a furnace at 300° C. for 1 hour.

In the present invention, the halogen content (i.e., the sum of fluorine content, chlorine content, bromine content, and iodine content) of the metal oxide particle may be expressed according to the halogen concentration (the sum of fluorine concentration, chlorine concentration, bromine concentration, and iodine concentration). The halogen content per gram of the metal oxide particle is, for example, 10 μmol/mL·g or less, more preferably 5 μmol/mL·g or less, and even more preferably 1 μmol/mL g.

In the present invention, the halogen content is determined according to the following method.

A slurry (10 g) containing 20% by mass of the metal oxide particles (containing 2 g of the metal oxide particles) is centrifuged for separation into the metal oxide particles and a supernatant liquid. The centrifugation conditions are not limited as long as the slurry is separated into the metal oxide particles and a supernatant liquid. The supernatant liquid (2 mL) is analyzed by ion chromatography to determine the halogen concentration of this liquid (unit: μmol/ml). The halogen concentration is directly taken as the halogen content per gram of the metal oxide particle (unit: μmol/mL·g).

Silyl Group for Surface Modification

The metal oxide particle of the present invention has a surface modified with at least one group selected from the group consisting of a silyl group represented by general formula (1) above and a silyl group represented by general formula (2) above.

When one bond is present between Si in a silyl group and a metal atom on the particle surface via —O—, —Si in the silyl group and the metal atom on the particle surface are linked by bonding (metalloxane bonding) via —O—. More specifically, Si and the metal atom on the particle surface are bonded by M-O—Si(X)$_n$— (wherein M is a metal atom on the particle surface, X is the same or different, and each represents a hydroxy group, a hydrolyzable substituent, a non-hydrolyzable substituent, or a bond with Si of another silyl group via —O—, and n is 0, 1, or 2).

When two bonds described above are present, one X represents "a bond with a metal atom on the particle surface via —O—." More specifically, Si and metal atoms on the particle surface are bonded by M-O—Si(X)$_2$(OM')$_1$— (wherein M and X are as defined above, and M' is a metal atom on the particle surface different from M).

When three bonds described above are present, two Xs each represent "a bond with a metal atom on the particle surface via —O—." More specifically, Si and metal atoms on the particle surface are bonded by M-O—Si(X)$_1$(OM')$_1$(OM")$_1$— (wherein M, M', and X are as defined above, and M" is a metal atom on the particle surface different from M or M').

Silyl Group Represented by General Formula (1)

In a silyl group represented by general formula (1):

$$-Si(X)_n\text{-}[L\text{-}CR^1(OH)\text{—}C(R^2)_2\text{-}A]_{3-n} \quad (1),$$

X is the same or different, and each represents a hydroxy group, a hydrolyzable substituent, a non-hydrolyzable substituent, a bond with Si of another silyl group via —O—, or a bond with a metal atom on the particle surface via —O—;

n is 0, 1, or 2;

L is a linkage group;

R$^1$ is a hydrogen atom, or an alkyl group that may contain an amino group, a hydroxy group, or an unsaturated bond;

R$^2$ is the same or different, and each represents a hydrogen atom, or an alkyl group that may contain an amino group, a hydroxy group, or an unsaturated bond; and A is a quaternary ammonium group.

In a silyl group represented by general formula (1), X is the same or different, and each represents a hydroxy group, a hydrolyzable substituent, a non-hydrolyzable substituent, a bond with Si of another silyl group via —O—, or a bond with a metal atom on the particle surface via —O—.

In X, the hydrolyzable substituent is a group that can be hydrolyzed in an aqueous system to form a Si—OH group. Depending on, for example, the degree of the hydrolysis during surface modification, the hydrolyzable group in a silane coupling agent used for surface modification, for example, remains as a hydrolyzable group without being hydrolyzed, is hydrolyzed to form a hydroxy group, or is hydrolyzed to form a hydroxy group and then further condensed with another hydroxy group. The hydrolyzable substituent is, for example, an alkoxy group, preferably a linear or branched C1-C6 alkoxy group, more preferably a methoxy group, an ethoxy group, a propoxy group, an isopropoxy group, a butoxy group, an isobutoxy group, a sec-butoxy group, or a tert-butoxy group, and even more preferably a methoxy group or an ethoxy group.

In X, the non-hydrolyzable substituent is a group that is not hydrolyzed in an aqueous system, i.e., a group that does not form a Si—OH group. The non-hydrolyzable substituent is, for example, an alkyl group, preferably a linear or branched C1-C6 alkyl group, more preferably a methyl group, an ethyl group, a propyl group, an isopropyl group, a butyl group, an isobutyl group, a sec-butyl group, or a tert-butyl group, and even more preferably a methyl group or an ethyl group.

In X, the bond with Si of another silyl group via —O— is a bond (siloxane bond) between Si in the silyl group represented by general formula (1) and Si in a silyl group existing in the vicinity thereof via an oxygen atom on the surface of the metal oxide particle, whereby the Si—O—Si structure is formed.

In X, the bond with a metal atom on the particle surface via —O— is a bond between Si in the silyl group and the particle, whereby the Si—O-M' structure or Si—O-M" structure is formed (wherein M' and M" are as defined above, and each represents a metal atom on the particle surface). The details of this bond are described above.

In one embodiment, X is preferably the same or different, and each represents a bond with a metal atom on the particle surface via —O—, a bond with Si of a silyl group present in the vicinity thereof via an oxygen atom, a hydroxy group, a methoxy group, an ethoxy group, or a methyl group.

In the silyl group represented by general formula (1), n is 0, 1, or 2. n is preferably 2 in order to achieve small steric hindrance (that is, for a reaction in which the epoxy ring of the silane coupling agent opens and is bonded to a tertiary amine to easily proceed).

In the silyl group represented by general formula (1), L is a linkage group. The linkage group typically corresponds to a group that is present between Si and the carbon atom that constitutes an epoxy ring in the silane coupling agent used for surface modification. In other words, the linkage group links between Si in the silyl group and the carbon atom that constituted an epoxy ring in the silane coupling agent used for surface modification. The linkage group is, for example, a linear or branched C1-C18 alkylene group.

The linear or branched C1-C18 alkylene group is, for example, a methylene group, an ethylene group, a propylene group, a butylene group, a hexylene group, a decylene group, or an octadecylene group, preferably a linear or branched C1-C8 alkylene group, and more preferably a linear or branched C1-C6 alkylene group. The number of branches in the alkylene group is, for example, 0, 1, 2, or 3, preferably 0, 1, or 2, and more preferably 0 or 1. When the number of branches is 0, the alkylene group is a linear alkylene group. The branched chain in the branched alkylene group is, for example, a C1-C3 alkyl group, and preferably a methyl group or an ethyl group. A branched chain refers to an alkyl group that is bonded to a carbon atom constituting the main chain of the branched alkylene group, the main chain representing a linear hydrocarbon chain connecting the carbon atom bonded to Si and the carbon atom bonded to A.

The linear or branched C1-C18 alkylene group is optionally substituted. The substituent is, for example, an amino group, an alkenyl group (e.g., vinyl group or allyl group), or an alkynyl group. The substituent may be used alone, or in a combination of two or more. The number of the substituents is, for example, 0, 1, 2, or 3, preferably 0, 1, or 2, more preferably 0 or 2, and even more preferably 0.

The linear or branched C1-C18 alkylene group may contain an oxygen atom (—O—), a nitrogen atom (—N—), or a sulfur atom (—S—), preferably an oxygen atom or a sulfur atom, and more preferably an oxygen atom, at an end of the alkylene chain or at any position in the alkylene chain. When these heteroatoms are present in the branched C1-C18 alkylene group, they may be present in the main chain or in the branched chain. When a nitrogen atom is present at an end of the alkylene chain or in the alkylene chain, the nitrogen atom may be —NH— or may be substituted with one substituent. In this case, the substituent may be, for example, a methyl group or an ethyl group. The total number of the oxygen atoms, nitrogen atoms, and sulfur atoms present at an end of the alkylene chain and in the alkylene chain is not particularly limited, and may be, for example, 1, 2, or 3, preferably 1 or 2, and more preferably 1.

In one embodiment, L is preferably *—(CH$_2$)$_3$—O—CH$_2$—, *—(CH$_2$)$_2$—O—CH$_2$—, *—(CH$_2$)$_3$—O—(CH$_2$)$_2$—, —(CH$_2$)$_3$—, —(CH$_2$)$_4$—, or —(CH$_2$)$_5$—. L is preferably *—(CH$_2$)$_3$—O—CH$_2$— or —(CH$_2$)$_4$— in view of easy availability of the silane coupling agent as a starting material and small steric hindrance. The asterisk (*) represents the Si(X)$_n$ side.

In the silyl group represented by general formula (1), R$^1$ is a hydrogen atom, or an alkyl group that may contain an amino group, a hydroxy group, or an unsaturated bond. The alkyl group is, for example, a linear or branched C1-C6 alkyl group, preferably a methyl group, an ethyl group, a propyl group, or an isopropyl group, and more preferably a methyl group or an ethyl group. The alkyl group that contains an unsaturated bond is, for example, a vinyl group or an allyl group. R$^1$ is more preferably a hydrogen atom.

In the silyl group represented by general formula (1), R$^2$ is the same or different, and each represents a hydrogen atom, or an alkyl group that may contain an amino group, a hydroxy group, or an unsaturated bond. The alkyl group is, for example, a linear or branched C1-C6 alkyl group, preferably a methyl group, an ethyl group, a propyl group, or an isopropyl group, and more preferably a methyl group or an ethyl group. The alkyl group that contains an unsaturated bond is, for example, a vinyl group or an allyl group. Two R$^2$s each preferably represent a hydrogen atom.

In the silyl group represented by general formula (1), A is a quaternary ammonium group. The quaternary ammonium group typically has a structure corresponding to the structure of a tertiary amine used as a starting material. For example, when the tertiary amine used as a starting material is a triethylamine, the corresponding quaternary ammonium group is a triethylammonium group. Examples of quaternary ammonium groups include those with a saturated hydrocarbon group (e.g., trimethylamine, triethylamine, or dimethylethylamine); and those with a hydroxy group, an ether group, an amino group, and/or a hydrocarbon group containing an unsaturated carbon bond (e.g., dimethylethanolamine, dimethylaniline, diethylaniline, dimethylbenzylamine, or pyridine). The quaternary ammonium group preferably contains three of the same or three different C1-C10 alkyl groups (preferably C1-C6 alkyl groups, and more preferably C1-C3 alkyl groups) that are optionally substituted with a hydroxy group, an amino group, or a phenyl group. In one embodiment, examples of quaternary ammonium groups include —N$^+$(CH$_3$)$_3$, —N$^+$(C$_2$H$_5$)$_3$, —N$^+$(CH$_3$)$_2$ (CH$_2$CH$_2$OH), —N$^+$(C$_2$H$_5$)$_2$ (CH$_2$CH$_2$OH), —N$^+$(CH$_3$)$_2$ (CH$_2$CH(OH)CH$_3$), and —N$^+$(CH$_3$)$_2$ (C(CH$_3$)$_2$ CH$_2$OH). The quaternary ammonium group is more preferably —N$^+$(C$_2$H$_5$)$_3$ or —N$^+$(CH$_3$)$_3$.

In terms of easy availability of the silane coupling agent as a starting material and small steric hindrance, the silyl group represented by general formula (1) is preferably —Si(X)$_2$—[(CH$_2$)$_3$O—CH$_2$—CH(OH)—CH$_2$-A]$_1$ or —Si(X)$_2$—[(CH$_2$)$_4$—CH(OH)—CH$_2$-A]$_1$.

Silyl Group Represented by General Formula (2)

In the silyl group represented by general formula (2):

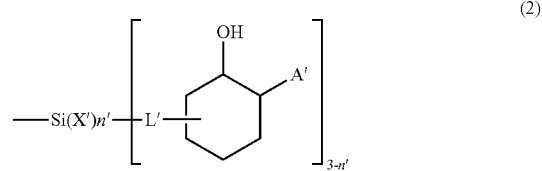

(2)

X' is the same or different, and each represents a hydroxy group, a hydrolyzable substituent, a non-hydrolyzable substituent, a bond with Si of another silyl group via —O—, or a bond with a metal atom on the particle surface via —O—;

n' is 0, 1, or 2;

L' is a linkage group; and

A' is a quaternary ammonium group.

In a silyl group represented by general formula (2), X' is the same or different, and each represents a hydroxy group, a hydrolyzable substituent, a non-hydrolyzable substituent, a bond with Si of another silyl group via —O—, or a bond with a metal atom on the particle surface via —O—. X' is as defined above for X.

In the silyl group represented by general formula (2), n' is 0, 1, or 2. n' is as defined above for n.

In the silyl group represented by general formula (2), L' is a linkage group. L' is as defined above for L.

In the silyl group represented by general formula (2), A' is a quaternary ammonium group. A' is as defined above for A.

In the silyl group represented by general formula (2), the following partial moiety:

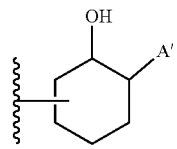

is preferably

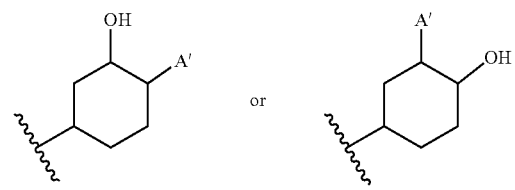

wherein A' is as defined above.

The silyl group represented by general formula (2) is preferably a group represented by the following formula in terms of easy availability of the silane coupling agent as a starting material (in the formula, X' and A' are as defined above).

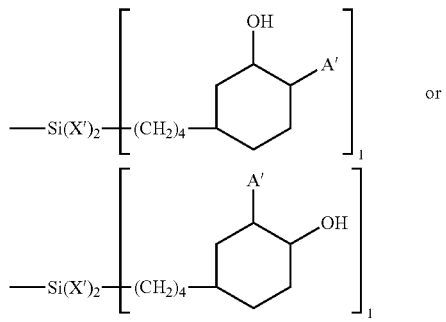

The metal oxide particles of the present invention can be used as a physical property improver in the fields of, for example, paper, textiles, and steel. In addition, the metal oxide particles of the present invention can also be used as an abrasive for chemical mechanical polishing (CMP), silicon wafer polishing, and glass polishing. The metal particles of the present invention, which has a low halogen content, can be preferably used as abrasive grains for polishing metals.

Production Method

In one embodiment, the metal oxide particle of the present invention can be produced by modifying the surface of metal oxide particle with a tertiary amine and a silane coupling agent having an epoxy ring. More specifically, the metal oxide particle of the present invention can be produced by performing the following steps (a) and (b).

A method for producing a metal oxide particle with a surface having a quaternary ammonium group, the method comprising the steps of:
  (a) mixing a metal oxide particle, a tertiary amine, and a silane coupling agent having an epoxy ring in any order in the presence or absence of water and/or an organic solvent; and
  (b) mixing an acid with the mixture obtained in step (a).

Although the metal oxide particle with a surface having a quaternary ammonium group produced by the production method of the present invention is preferably the metal oxide particle of the present invention described above, the metal oxide particle with a surface having a quaternary ammonium group produced by the production method of the present invention can also encompass other metal oxide particles with a surface having a quaternary ammonium group (preferably metal oxide particles having a surface modified with at least one group selected from the group consisting of a silyl group represented by general formula (1) above and a silyl group represented by general formula (2) above).

Step (a)

In step (a), a metal oxide particle, a tertiary amine, and a silane coupling agent having an epoxy ring are mixed in any order in the presence or absence of water and/or an organic solvent to prepare a mixture. Stirring may be performed at any stage, i.e., before, during, or after mixing. The method of stirring is not particularly limited.

The metal oxide particle is not particularly limited, and the same particle as described above in the "Metal Oxide Particle" section can be used.

The tertiary amine is not particularly limited as long as a metal oxide particle with a surface having a quaternary ammonium group is obtained. A tertiary amine that corresponds to a desired quaternary ammonium group A or A' of general formula (1) or (2) above may be used. For example, when A represents a triethylammonium group, the tertiary amine may be triethylamine. Thus, tertiary amines that correspond to the preferable quaternary ammonium groups represented by A or A' described above are preferably used, such as trimethylamine, triethylamine, 2-dimethylaminoethanol, 2-diethylaminoethanol, 1-dimethylamino-2-propanol, and 2-dimethylamino-2-methyl-1-propanol. The tertiary amine is more preferably trimethylamine, triethylamine, or 2-dimethylaminoethanol.

The amount of tertiary amine for use is not particularly limited as long as the surface of the particle is covered with a silyl group having a quaternary ammonium group. Since a tertiary amine reacts with the epoxy ring in a silane coupling agent, the amount may be determined according to the amount of the epoxy ring. The amount of tertiary amine for use is, for example, 1 mol or more, preferably 1.2 mol or more, and more preferably 1.5 mol or more, per mole of the epoxy ring. When the lower limit of the amount of tertiary amine for use is in the above range, the frequency of contact between the tertiary amine and the epoxy ring is easily increased, and the condensation reaction between the silane coupling agent and the particles is easily promoted. The amount of tertiary amine for use is, for example, 50 mol or less, and preferably 30 mol or less, per mole of the epoxy ring. The amount of tertiary amine for use may also be, for example, 1 to 50 mol, 1.2 to 50 mol, 1.5 to 50 mol, 1 to 30 mol, 1.2 to 30 mol, or 1.5 to 30 mole, per mol of the epoxy ring.

In step (a), the silane coupling agent is not particularly limited as long as it has an epoxy ring. The silane coupling agent for use may be a silane coupling agent that has an epoxy ring and that corresponds to a desired L or L' in general formula (1) or (2) above. Examples include a silane represented by the following general formula (3) or a silane represented by general formula (4).

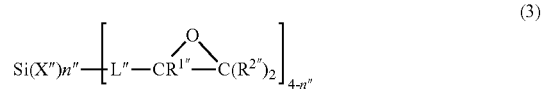

In the formula above,
X" is the same or different, and each represents a hydroxy group, a hydrolyzable substituent, or a non-hydrolyzable substituent, with the proviso that at least one X" is a hydrolyzable substituent;
n" is 1, 2, or 3;
L" is a linkage group;
$R^{1'''}$ is a hydrogen atom, or an alkyl group that may contain an amino group, a hydroxy group, or a unsaturated bond; and
$R^{2'''}$ is the same or different, and each represents a hydrogen atom, or an alkyl group that may contain an amino group, a hydroxy group, or an unsaturated bond.

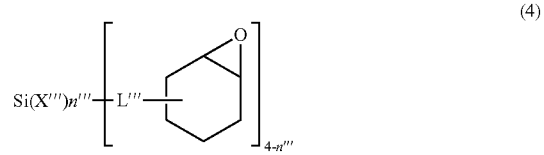

In the formula above,

X''' is the same or different, and each represents a hydroxy group, a hydrolyzable substituent, or a non-hydrolyzable substituent, with the proviso that at least one X''' is a hydrolyzable substituent;

n''' is 1, 2, or 3; and

L''' is a linkage group.

In general formulas (3) and (4), at least one X'' and at least one X each represent a hydrolyzable substituent. The hydrolyzable substituent and the non-hydrolyzable substituent represented by X'' or X''' may be the same as the hydrolyzable substituent and the non-hydrolyzable substituent described for the silyl group represented by general formula (1) above. X'' and X''' are each preferably a hydrolyzable substituent, such as an alkoxy group, more preferably a linear or branched C1-C6 alkoxy group, even more preferably a methoxy group, an ethoxy group, a propoxy group, an isopropoxy group, a butoxy group, an isobutoxy group, a sec-butoxy group, or a tert-butoxy group, and still more preferably a methoxy group or an ethoxy group.

In general formulas (3) and (4), n'' and n''' are each 1, 2, or 3, preferably 2 or 3, and more preferably 3.

In general formulas (3) and (4), L'' and L''' each represent a linkage group. The linkage group may be the same linkage group as described for the silyl group represented by general formula (1) above.

In general formula (3), $R^{1''}$ is a hydrogen atom, or an alkyl group that may contain an amino group, a hydroxy group, or an unsaturated bond. $R^{1''}$ may be the same as $R^1$ described for the silyl group represented by general formula (1) above.

In general formula (3), $R^{2''}$ is the same or different, and each represents a hydrogen atom, or an alkyl group that may contain an amino group, a hydroxy group, or an unsaturated bond. $R^{2''}$ may be the same as $R^2$ described for the silyl group represented by general formula (1) above.

Examples of the silanes represented by general formula (3) include glycidoxyalkyltrialkoxysilanes, such as 3-glycidoxypropyltrimethoxysilane, 3-glycidoxypropyltriethoxysilane, 3-glycidoxymethyltrimethoxysilane, and 3-glycidoxymethyltriethoxysilane; glycidoxyalkyldialkoxyalkylsilanes, such as 3-glycidoxypropylmethyldimethoxysilane and 3-glycidoxypropylmethyldiethoxysilane; glycidoxyalkylalkoxydialkylsilanes, such as 3-glycidoxypropyldimethylmethoxysilane and 3-glycidoxypropyldimethylethoxysilane; and epoxyalkyltrialkoxysilanes, such as 5,6-epoxyhexyltrimethoxysilane and 5,6-epoxyhexyltriethoxysilane.

In view of easy availability and small steric hindrance, 3-glycidoxypropyltrimethoxysilane and 3-glycidoxypropyltriethoxysilane are preferred.

Examples of the silanes represented by general formula (4) include epoxycyclohexylalkyltrialkoxysilanes, such as (3,4-epoxycyclohexyl)methyltrimethoxysilane, (3,4-epoxycyclohexyl)methyltriethoxysilane, 2-(3,4-epoxycyclohexyl)ethyltrimethoxysilane, and 2-(3,4-epoxycyclohexyl)ethyltriethoxysilane. In view of easy availability, 2-(3,4-epoxycyclohexyl)ethyltrimethoxysilane and 2-(3,4-epoxycyclohexyl)ethyltriethoxysilane are preferred.

The amount of the silane coupling agent having an epoxy ring for use is not particularly limited as long as the surface of the particle is covered with the silyl group having a quaternary ammonium group. The amount for use is such that (the number of moles of the silane coupling agent)/(the total number of moles of silanol groups on the particle surface) is, for example, 0.15 or more, preferably 0.30 or more, and more preferably 0.50 or more. The amount for use within this range is advantageous because stable cationic particles are obtained at a pH near neutral. Further, the amount for use may be a value calculated by ((the mass of the silane coupling agent for use (g))×(the minimum coverage area of the silane coupling agent $(m^2/g)$)/(the total surface area of the particle $(m^2)$); the calculated value is, for example, 1.0 or less, preferably 0.50 or less, and more preferably 0.30 or less. The amount for use within this range is advantageous to prevent the silane coupling agent from remaining in the reaction liquid without reacting with the particles.

The total number of moles of silanol groups on the particle surface, the minimum coverage area of the silane coupling agent, and the total surface area of the particle are obtained according to the following methods.

Total Number of Moles of Silanol Groups on the Particle Surface

The total number of moles of silanol groups on the particle surface is calculated from the sodium hydroxide consumption from pH 4 to pH 9 according to the method disclosed in Analytical Chemistry, vol. 28, No. 12, 1956, pages 1982-1983.

Minimum Coverage Area of Silane Coupling Agent

The minimum coverage area of silane coupling agent $(m^2/g)$ is calculated from the Stuart-Briegleb molecular model. The equation is as follows.

$$\text{Silane coupling agent minimum coverage area } (m^2/g) = 78260/\text{the molecular weight of silane coupling agent}$$

Total Surface Area of Particles

The total surface area of particles is calculated as $6000x/R\cdot\rho$ $(m^2)$, wherein R (nm) represents the average diameter of primary particles measured in an SEM image, x (g) represents the weight of metal oxide particles, and $\rho$ $(g/cm^3)$ represents the absolute specific gravity of the metal oxide particle.

Step (a) can be performed in the presence or absence of water and/or an organic solvent (sometimes simply referred to below as a "medium"). To suppress aggregation, it is advantageous and preferable to perform the step in the presence of a medium. When a medium is used, the amount of the medium for use is not particularly limited as long as the surface is covered. The amount is such that the amount of metal oxide particle is, for example, 10 to 60 parts by mass, and preferably 10 to 50 parts by mass, based on 100 parts by mass of the total of the medium and the metal oxide particle. The use of the medium in an amount within the above range is advantageous to increase the frequency of contact between the silane coupling agent and the particles and improve the reaction efficiency while suppressing particle aggregation and an increase in the number of coarse particles.

The medium is preferably water alone or a combination of water and an organic solvent. The use of water improves the reactivity of the silane coupling agent, and is preferable. The organic solvent is not particularly limited as long as a metal oxide particle with a surface having a quaternary ammonium group is obtained. Examples include alcohols, such as methanol, ethanol, and 2-propanol. The organic solvent is preferably methanol or ethanol.

The ratio of water to the organic solvent is such that, for example, the amount of water is 30 parts by mass or more, preferably 40 parts by mass or more, and more preferably 50 parts by mass or more, and also such that, for example, the amount of water is 100 parts by mass or less, and preferably 95 parts by mass or less, based on 100 parts by mass of the total of water and the organic solvent. The ratio of water to the organic solvent can also be such that, for example, the amount of water is 30 to 100 parts by mass, 40 to 100 parts by mass, 50 to 100 parts by mass, 30 to 95 parts by mass, 40 to 95 parts by mass, or 50 to 95 parts by mass, based on 100 parts by mass of the total of water and the organic solvent. The use of a higher percentage of water is advantageous in terms of production costs.

When added to the reaction system, the medium may be added in a single step or in multiple (e.g., two or three) steps. Further, when water and the organic solvent are used together, the entire amount of water and/or the entire amount of the organic solvent may be added to the reaction system in a single step or in multiple (e.g., two or three) steps. When added in multiple steps, some of the water and some of the organic solvent may be added in any order. For example, after adding a tertiary amine to water containing particles, a silane coupling agent and an organic solvent may be added, followed by the addition of an acid in the next step.

In step (a), the order of mixing the metal oxide particle, the tertiary amine, and the silane coupling agent having an epoxy ring is not particularly limited as long as the surface of the particle is covered with a silyl group containing a quaternary ammonium group. When water and/or an organic solvent is used in step (a), the order of mixing water and/or an organic solvent, the metal oxide particle, the tertiary amine, and the silane coupling agent having an epoxy ring is also not particularly limited.

To increase the frequency of contact between the silane coupling agent and the particles and improve the reaction efficiency while suppressing particle aggregation and an increase in the number of coarse particles, the silane coupling agent is preferably added and mixed after the metal oxide particle and the tertiary amine are mixed. At this time, if the silane coupling agent is diluted with an organic solvent, and continuously added as a diluted liquid to the mixture of the metal oxide particle and the tertiary amine, particle aggregation is further suppressed, which is more preferable.

Another method for mixing may comprise mixing a powder of the metal oxide particle with the silane coupling agent in the absence of water and/or an organic solvent, i.e., in a dry state without any medium, and further mixing the tertiary amine to prepare a mixture.

Another method for mixing may comprise mixing a powder of the metal oxide particle with the silane coupling agent in the absence of water and/or an organic solvent, i.e., in a dry state without any medium, removing an unreacted silane coupling agent so as to obtain only surface-modified particles, and then mixing the resulting particles with the tertiary amine in the absence of a silane coupling agent in the presence or absence of water and/or an organic solvent to prepare a mixture.

Yet another method for mixing comprises mixing the tertiary amine with the silane coupling agent in advance to obtain a silane containing a quaternary ammonium group in the absence of water and/or an organic solvent, and mixing the metal oxide particle with the obtained silane to achieve surface modification in the absence of water and/or an organic solvent to prepare a mixture.

In step (a), the temperature of the medium when mixing is performed in the presence of water and/or an organic solvent is not particularly limited as long as the metal oxide particle with a surface having a quaternary ammonium group is obtained. The temperature is, for example, 0° C. to a temperature equal to or below the boiling point of the medium, preferably 20° C. to 80° C., and more preferably 30° C. to 70° C. It is advantageous to adjust the temperature of the medium to be within this range during mixing and during reaction to suppress particle aggregation and shorten the reaction time by improving the reactivity. The temperature at which mixing is performed in the absence of water and/or an organic solvent is not particularly limited as long as the metal oxide particle with a surface having a quaternary ammonium group is obtained.

In step (a), the time is not particularly limited as long as the metal oxide particle with a surface having a quaternary ammonium group is obtained. The time may be, for example, 1 minute to 48 hours, and preferably 1 minute to 24 hours after the metal oxide particle, the tertiary amine, the silane coupling agent having an epoxy ring, and optionally water and/or an organic solvent are all mixed.

In step (a), the pH of the mixture liquid when mixing is performed in the presence of water alone or in the presence of water and an organic solvent is not particularly limited as long as the metal oxide particle with a surface having a quaternary ammonium group is obtained. The pH is, for example, 9 or more, and preferably 10 or more.

Step (b)

In step (b), an acid is mixed with the mixture obtained in step (a) to thus produce a metal oxide particle with a surface having a quaternary ammonium group. The mixing of an acid can improve the reactivity and suppress particle aggregation and an increase in the number of coarse particles. Stirring may be performed at any stage, i.e., before, while, or after an acid is mixed. It is preferable that the mixture is stirred so as to suppress particle aggregation and improve the reactivity. The method of stirring is not particularly limited.

The acid is not particularly limited as long as the metal oxide particle with a surface having a quaternary ammonium group is obtained. Examples of the acid include inorganic acids, such as nitric acid, phosphoric acid, hydrochloric acid, and sulfuric acid, and organic acids, such as acetic acid, lactic acid, methanesulfonic acid, malic acid, and citric acid. The acid is preferably an inorganic acid or a monovalent organic acid. The acid is more preferably halogen-free acetic acid or nitric acid, which have low metal corrosion properties.

The amount of acid for use is not particularly limited as long as the surface of the particle is covered with the silyl group having a quaternary ammonium group. The amount is such that the pH of the mixture liquid after the acid is mixed is, for example, 0 to 10, preferably 0 to 8.5, and more preferably 0 to 8.0.

The temperature of the mixture liquid while the acid is mixed in step (b) is not particularly limited as long as the metal oxide particle with a surface having a quaternary ammonium group is obtained. The temperature is, for example, a temperature equal to or below the boiling point of the medium, preferably 60° C. or lower, and more preferably 40° C. or lower, and is, for example, 0° C. or higher. The temperature of the mixture liquid can also be, for example, 0° C. to a temperature equal to or below the boiling point of the medium, 0 to 60° C., or 0 to 40° C.

The time in step (b) is not particularly limited as long as the metal oxide particle with a surface having a quaternary ammonium group is obtained. The time is, for example, 1 minute to 48 hours, and preferably 1 minute to 24 hours, after mixing the acid.

When an organic solvent is used in step (a), the organic solvent may be replaced with water to remove the organic solvent from the system after the acid is mixed, and the reaction is completed in step (b).

The metal oxide particle with a surface having a quaternary ammonium group obtained in step (b) can be directly used as a colloidal particle if possible, or the particle can be separated from the dispersion medium by known techniques.

The production method of the present invention encompasses a method for producing a metal oxide particle with a surface having a quaternary ammonium group, the method comprising the steps of mixing a tertiary amine with a dispersion in which a metal oxide particle is dispersed in a medium, and mixing a silane coupling agent having an epoxy ring with the dispersion obtained in the previous step.

The production method of the present invention is capable of producing a metal oxide particle that has a surface having a quaternary ammonium group and has a controlled aggregation ratio. Further, the production method of the present invention uses the silane coupling agent having an epoxy ring and the tertiary amine described above, whereby a metal oxide particle with a surface having a quaternary ammonium group can be produced even in systems in which silanes that contain halide ions or silanes with halogen groups are not used.

EXAMPLES

The present invention is described in detail with reference to, e.g., Examples. However, the present invention is not limited to these.

Example 1

Step I: 9000 g of an aqueous dispersion of silica particles (silica A; manufactured by Fuso Chemical Co., Ltd., silica particles with the properties shown in Table 1, silica concentration: 20% by mass) was placed in a flask, to which 160.2 g of triethylamine was added. The pH of the obtained dispersion was 11.7.
Step II: the dispersion obtained in step I was heated to an internal temperature of 55° C., and a mixture liquid of 124.7 g of 3-glycidyloxypropyltrimethoxysilane and 499.1 g of methanol was added thereto over a period of 60 minutes while the temperature was maintained at 55° C. After completion of the addition of the total amount, the mixture was maintained at 55° C. for 30 minutes.
Step III: 3450 g of the dispersion obtained in step II was placed in another flask, and 31.3 g of acetic acid was added thereto at room temperature (20° C.). The pH of the obtained mixture liquid was 6.5.
Step IV: in order to remove methanol from the mixture liquid obtained in step III by distilling off, the mixture liquid was heated under ordinary pressure, and 2000 ml of pure water was added dropwise to the mixture liquid while keeping the volume constant. The methanol was thus replaced by water, and 3328 g of an aqueous dispersion of silica particles with a surface modified with a silyl group having a quaternary ammonium group ($-Si(X)_2-CH_2CH_2CH_2-O-CH_2-CH(OH)CH_2-N^+(C_2H_5)_3$) was obtained (silica concentration: 20% by mass).

The pH in each step was measured by a D-74 pH meter manufactured by Horiba, Ltd.
Measurement of Particle Size
The average diameter of primary particles of silica particles before step I and silica particles after step IV (R; nm), the average particle size measured by dynamic light scattering (particle size of secondary particles) (D2; run), and the aggregation ratio (D2/R) were measured according to the following methods. Table 1 shows the results.
Average Diameter of Primary Particles; R The diameter (R; nm) of primary particles of colloidal silica was measured using a scanning electron microscope (SEM). Specifically, an SEM image with 200000× magnification of silica particles was obtained, the diameters of 50 randomly selected silica particles in the image were measured, and the average value was calculated.
Average Particle Size by Dynamic Light Scattering; D2
A sample for measurement by a dynamic light scattering method was prepared by mixing colloidal silica and a 0.3% by weight aqueous citric acid solution. Using the obtained sample for measurement, the average particle size (D2; nm) was measured by the dynamic light scattering method (ELSZ-2000S manufactured by Otsuka Electronics Co., Ltd.).

The dispersion of silica particles obtained in step II and the aqueous dispersion of amino-modified silica particles obtained in step IV were used to measure the residual silane concentration (ppm), isoelectric point, and absolute specific gravity (g/cm$^3$; except for the dispersion of silica particles obtained in step II) according to the following methods. Table 2 shows the results.
Residual Silane Concentration
The silica solids in the aqueous dispersion were sedimented by centrifugation, and the residual silane concentration in the supernatant was analyzed with an ICP emission spectrometer.
Isoelectric Point
The isoelectric point was measured with a DT-1202 analyzer from Dispersion Technology by using a solution obtained by diluting a dispersion of colloidal silica with water to a silica solids concentration of 2%.
Absolute Specific Gravity
The absolute specific gravity was measured by a liquid phase displacement method using ethanol after drying metal oxide particles on a hot plate at 150° C. and calcining in a furnace at 300° C. for 1 hour.

The effect of adding acetic acid was confirmed by comparing the dispersion of silica particles obtained in step II and the amino-modified silica particles obtained in step IV.

Examples 2 to 5

Aqueous dispersions of amino-modified silica were obtained in the same manner as in Example 1, except that acetic acid was replaced with 25.5 g of 60% nitric acid (Example 2), 29.7 g of 85% lactic acid (Example 3), and 19.9 g of 85% phosphoric acid (Example 4), and that the pH after the acids were added was 5 to 7. Additionally, an aqueous dispersion of amino-modified silica was obtained in the same manner as in Example 1, except that the silica A was replaced with Ludox CL-X of the same weight, and that the amount of acetic acid added was 66.0 g (Example 5). The average diameter, the average particle size by dynamic light scattering (particle size of secondary particles), the aggregation ratio, and the number of coarse particles (only for Example 5) of the obtained silica particles were measured in the same manner as in Example 1. Table 1 shows the results. The number of coarse particles was measured according to the following method.
Number of Coarse Particles; LPC
The number of coarse particles (unit: number of particles/mL) was defined as the number of particles having a size of 0.56 μm or larger contained in 1 mL of slurry detected using an Accusizer 780 (Particle Sizing Systems).

Comparative Example 1

205 g (45% solids content) of a dispersion of Ludox CL-X (registered trademark) colloidal silica (available from Sigma-Aldrich), 65.3 g of water, and 163 g of methanol were stirred and mixed. A 50% solution of N-trimethoxysilylpropyl-N,N,N-trimethylammonium chloride in methanol (28.5 g) was added to this mixture at room temperature. The resulting mixture was heated at 68 to 73° C. for 24 hours to obtain a dispersion with a pH of 8.4. The average diameter, the average particle size by dynamic light scattering (particle size of secondary particles), and the aggregation ratio of the obtained silica particles were measured in the same manner as in Example 1, and the number of coarse particles was also measured in the same manner as in Example 5. Table 1 shows the results.

Comparative Example 2: Surface Modification Using Halogen-Containing Silane 320.7 g of chloropropyltriethoxysilane was placed in a 1-L flask, and 154.7 g of N,N,N',N'-tetramethylethylenediamine was rapidly added with stirring. While vigorously stirring, 160.3 g of water was added in 2 minutes and 14 seconds. The resulting mixture was heated and refluxed for 6 hours, and then, 64.1 g of water was added in 1 minute and 20 seconds. After the resulting mixture was further heated and refluxed for 1.5 hours, 160.1 g of water was added in 2 minutes and 11 seconds.

Ethanol produced by hydrolysis was removed by distilling off using an evaporator in a hot water bath at 49° C. to 54° C. under a pressure of 100 to 270 millibars. After distilling off about 170 g of a mixture of ethanol and water, 32.7 g of water was rapidly added. Thereafter, 223 g of a mixture of ethanol and water was further distilled off, and 223 g of water was added, whereby a surface treatment agent was obtained.

110.0 g of water was placed in a 500-mL beaker, to which 7.15 g of formic acid and 2.00 g of the surface treatment agent obtained above were added and mixed with strong stirring at 2000 rpm by using an HM-310 homomixer. When 117.8 g of LUDOX CL-X (silica concentration: 45% by mass) was rapidly added to this mixture liquid, the liquid became cloudy. The mixture was stirred at 2000 rpm for 5 minutes and then stirred at 12000 rpm for 10 minutes. The mixture was then stirred at 5000 rpm for 60 minutes while being heated in a hot water bath at 60° C. The mixture was then allowed to cool and filtered through a 300-μm sieve. The average diameter, the average particle size by dynamic light scattering (particle size of secondary particles), and the aggregation ratio of the obtained silica particles were measured in the same manner as in Example 1. Table 1 shows the results.

Comparative Example 3: Surface Modification Using Halogen-Containing Ammonium Salt 750.0 g of a dispersion of LUDOX TMA colloidal silica (silica concentration: 34% by mass) was placed in a 3-L flask and mixed with 967.0 g of ethanol. When 172.5 g of 3-aminopropyltrimethoxysilane was added dropwise to the resulting mixture liquid over a period of 126 minutes at room temperature, the mixture became cloudy. This mixture was heated at about 50° C. for 24 hours. Ethanol was distilled off from the reaction liquid using an evaporator to obtain 31.9% by mass of a dispersion of 3-aminopropylsilane-modified silica nanoparticles.

The obtained dispersion of 3-aminopropylsilane-modified silica nanoparticles (100.0 g) was placed in a 300-mL flask, and 19.8 g of a 39% by mass aqueous solution of 3-chloro-2-hydroxypropyldimethyldodecylammonium chloride salt was added over a period of 4 hours while the dispersion was heated to 75° C. The mixture was maintained at 75° C. for 4 hours with stirring. After cooling to room temperature, 51.0 g of water was added to obtain a dispersion of modified silica nanoparticles. The average diameter, the average particle size by dynamic light scattering (particle size of secondary particles), and the aggregation ratio of the obtained silica particles were measured in the same manner as in Example 1. Table 1 shows the results.

TABLE 1

| | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Type of acid | Acetic acid | Nitric acid | Lactic acid | Phosphoric acid | Acetic acid | None | Formic acid | None |
| Type of silica particles | Silica A | Silica A | Silica A | Silica A | Ludox CL-X | Ludox CL-X | Ludox CL-X | Ludox TMA |
| Analysis value before surface modification | | | | | | | | |
| Average particle size by dynamic light scattering (D2) | 51 nm | 51 nm | 51 nm | 51 nm | 34 nm | 34 nm | 34 nm | 34 nm |
| Average diameter of primary particles measured in an SEM image (R) | 24 nm | 24 nm | 24 nm | 24 nm | 24 nm | 24 nm | 24 nm | 24 nm |
| Aggregation ratio | 2.1 | 2.1 | 2.1 | 2.1 | 1.4 | 1.4 | 1.4 | 1.4 |
| Analysis value after surface modification | | | | | | | | |
| Average particle size by dynamic light scattering (D2) | 53 nm | 53 nm | 53 nm | 53 nm | 42 nm | 136 nm | 129 nm | 2959 nm |
| Average diameter of primary particles measured in an SEM image (R) | 24 nm | 24 nm | 23 nm | 24 nm | 24 nm | 23 nm | 23 nm | 23 nm |
| Aggregation ratio | 2.2 | 2.2 | 2.3 | 2.2 | 1.8 | 5.9 | 5.6 | 129 |
| LPC Number of coarse particles of 0.56 μm or larger (number of particles/mL) | — | — | — | — | $6.9 \times 10^6$ | $9.0 \times 10^8$ | — | — |

TABLE 2

| | Example 1 | |
|---|---|---|
| | Dispersion of silica particles obtained in step II (before acetic acid addition) | Aqueous dispersion of amino-denatured silica obtained in step IV (after acetic acid addition and water replacement) |
| Residual silane concentration | 1373 ppm | 373 ppm |
| Isoelectric point | pH 9.6 | pH 10.8 |
| Absolute specific gravity (g/cm³) | — | 2.08 |

In Examples 1 to 5, no aggregation of particles was observed. Further, as demonstrated in the Examples, it was possible to produce silica particles with a surface having a quaternary ammonium group without using halogen-containing compounds. Furthermore, Table 1 reveals that Examples 1 to 5 achieved a smaller increase in D2 and the aggregation ratio caused by amino modification, compared with Comparative Example 1, and that Example 5 maintained a smaller number of coarse particles, compared with Comparative Example 1.

Table 2 shows a comparison of the residual silane concentrations and the isoelectric points between the dispersion of silica particles obtained in step II and the aqueous dispersion of amino-modified silica obtained in step IV, which reveals that the addition of acetic acid reduced the residual silane concentration, and that the surface of the silica particles was treated, the quaternary ammonium group was bonded to the particle surface, and the isoelectric point thus shifted to a higher pH.

In the production method of Comparative Example 1, silica particles with a surface having a quaternary ammonium group were obtained using a silane coupling agent having a quaternary ammonium group; however, this coupling agent contained halide ions (Cl⁻) having metal corrosion properties. In addition, in Comparative Example 1, the average particle size by dynamic light scattering greatly increased from 34 nm to 136 nm, indicating aggregation. The number of coarse particles also greatly increased in comparison with that of Example 5. In Comparative Examples 2 and 3 as well, the average particle size by dynamic light scattering and the aggregation ratio were greatly increased after the surface modification compared with before the surface modification.

The invention claimed is:

1. A metal oxide particle having a surface modified with a silyl group and having an aggregation ratio (average particle size measured by dynamic light scattering/average diameter of primary particles measured in an SEM image) of 5.0 or less,
    an isoelectric point of a colloidal aqueous dispersion of the metal oxide particles being at least pH 10.8, the colloidal aqueous dispersion having a solids concentration of the metal oxide particles of 2 wt %,
    the silyl group being at least one group selected from the group consisting of a silyl group represented by general formula (1):

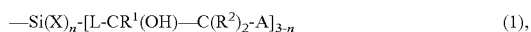

wherein
X is the same or different, and each represents a hydroxy group, a hydrolyzable substituent, a non-hydrolyzable substituent, a bond with Si of another silyl group via —O—, or a bond with a metal atom on the particle surface via —O—;
n is 0, 1, or 2;
L is a linkage group;
$R^1$ is a hydrogen atom, or an alkyl group that may contain an amino group, a hydroxy group, or an unsaturated bond;
$R^2$ is the same or different, and each represents a hydrogen atom, or an alkyl group that may contain an amino group, a hydroxy group, or an unsaturated bond; and
A is a quaternary ammonium group, and
a silyl group represented by general formula (2):

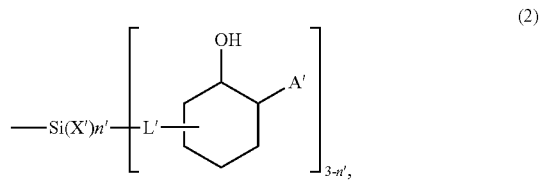

wherein
X' is the same or different, and each represents a hydroxy group, a hydrolyzable substituent, a non-hydrolyzable substituent, a bond with Si of another silyl group via —O—, or a bond with a metal atom on the particle surface via —O—;
n' is 0, 1, or 2;
L' is a linkage group; and
A' is a quaternary ammonium group.

2. The metal oxide particle according to claim 1, wherein the metal oxide particle has an absolute specific gravity of 1.60 or more in a dry powder state.

3. The metal oxide particle according to claim 2, wherein the metal oxide particle is a silica particle.

4. The metal oxide particle according to claim 2, wherein the aggregation ratio is 1.5 to 5.0.

5. The metal oxide particle according to claim 2, wherein the average diameter of primary particles is 120 nm or less.

6. The metal oxide particle according to claim 2, wherein the halogen content per gram of the metal oxide particle is 10 μmol/mL·g or less.

7. The metal oxide particle according to claim 1, wherein the metal oxide particle is a silica particle.

8. The metal oxide particle according to claim 7, wherein the aggregation ratio is 1.5 to 5.0.

9. The metal oxide particle according to claim 7, wherein the average diameter of primary particles is 120 nm or less.

10. The metal oxide particle according to claim 7, wherein the halogen content per gram of the metal oxide particle is 10 μmol/mL·g or less.

11. The metal oxide particle according to claim 1, wherein the aggregation ratio is 1.5 to 5.0.

12. The metal oxide particle according to claim 11, wherein the average diameter of primary particles is 120 nm or less.

13. The metal oxide particle according to claim 11, wherein the halogen content per gram of the metal oxide particle is 10 μmol/mL·g or less.

14. The metal oxide particle according to claim 1, wherein the average diameter of primary particles is 120 nm or less.

15. The metal oxide particle according to claim 14, wherein the halogen content per gram of the metal oxide particle is 10 μmol/mL·g or less.

16. The metal oxide particle according to claim 1, wherein the halogen content per gram of the metal oxide particle is 10 μmol/mL g or less.

\* \* \* \* \*